United States Patent
Oblinger et al.

(10) Patent No.: US 10,927,797 B2
(45) Date of Patent: Feb. 23, 2021

(54) EXHAUST LINE VALVE WITH FACILITATED COUPLING BETWEEN THE ACTUATOR AND THE FLAP, AND METHOD OF ASSEMBLING SUCH A VALVE

(71) Applicant: FAURECIA SYSTEMES D'ECHAPPEMENT, Nanterre (FR)

(72) Inventors: Benjamin Oblinger, Lyoffans (FR); Julien Cambillard, Belfort (FR); Gilbert Delplanque, Sochaux (FR); François Lacouture, Besancon (FR)

(73) Assignee: FAURECIA SYSTEMES D'ECHAPPEMENT

( * ) Notice: Subject to any disclaimer, the term of this patent is extended or adjusted under 35 U.S.C. 154(b) by 8 days.

(21) Appl. No.: 16/210,134

(22) Filed: Dec. 5, 2018

(65) Prior Publication Data

US 2019/0170092 A1    Jun. 6, 2019

(30) Foreign Application Priority Data

Dec. 6, 2017  (FR) ........................... 1761702

(51) Int. Cl.
  *F02M 26/70*   (2016.01)
  *F16K 1/22*    (2006.01)
  (Continued)

(52) U.S. Cl.
  CPC ............. *F02M 26/70* (2016.02); *F02D 9/04* (2013.01); *F02D 9/1065* (2013.01); *F16K 1/221* (2013.01);
  (Continued)

(58) Field of Classification Search
  CPC ........ F02M 26/70; F02M 26/54; F02M 26/67; F01N 13/08; F16K 1/221; F16K 31/043;
  (Continued)

(56) References Cited

U.S. PATENT DOCUMENTS

2005/0183705 A1* 8/2005 Nanba ............... F02D 9/1045
                                                         123/568.24
2017/0138274 A1* 5/2017 Stark ................. F02D 9/1065
                        (Continued)

FOREIGN PATENT DOCUMENTS

DE    102011107088 A1    1/2013
DE    102013103105 A1   10/2014
                        (Continued)

OTHER PUBLICATIONS

French Search Report for French Application No. 1761702 dated Aug. 16, 2018.

*Primary Examiner* — George C Jin
(74) *Attorney, Agent, or Firm* — Carlson, Gaskey & Olds, P.C.

(57) ABSTRACT

An exhaust valve includes a body defining a passage and a flap that pivots about an axis relative to the body to selectively close/open the passage. An actuator moves the flap and a device couples the flap to the actuator. This coupling device comprises: a compression spring having a proximal end that rotates about the axis with a first element between the flap and an actuator output shaft and a distal end; a seat engaged with the distal end, while the seat is fixed in rotation about the axis with the first element, and a torsionally-rigid transmission member fixed in rotation about the axis with the first element and that immobilizes the distal end relative to the proximal end in a plane that is orthogonal to the axis. The transmission member has a slot that is elongated parallel to the axis and is traversed by the distal end.

18 Claims, 7 Drawing Sheets

(51) Int. Cl.
    *F02D 9/04*     (2006.01)
    *F16K 31/04*    (2006.01)
    *F02D 9/10*     (2006.01)
    *F02M 26/54*        (2016.01)
    *F02M 26/67*        (2016.01)
    *F02D 9/02*         (2006.01)

(52) U.S. Cl.
    CPC ............ *F16K 31/043* (2013.01); *F02D 9/107* (2013.01); *F02D 2009/0261* (2013.01); *F02D 2009/0264* (2013.01); *F02M 26/54* (2016.02); *F02M 26/67* (2016.02)

(58) Field of Classification Search
    CPC ........ F16K 31/048; F02D 9/04; F02D 9/1065; F02D 9/107
    See application file for complete search history.

(56) References Cited

U.S. PATENT DOCUMENTS

| | | | |
|---|---|---|---|
| 2017/0254433 A1 | 9/2017 | Steinhauser | |
| 2017/0268433 A1* | 9/2017 | Aigner | ................. F16K 31/048 |
| 2017/0284310 A1 | 10/2017 | Delplanque et al. | |
| 2018/0128189 A1* | 5/2018 | Varelis | ................. F02D 9/1045 |

FOREIGN PATENT DOCUMENTS

| | | |
|---|---|---|
| FR | 3014143 A1 | 6/2015 |
| WO | 2016091565 A1 | 6/2016 |

\* cited by examiner

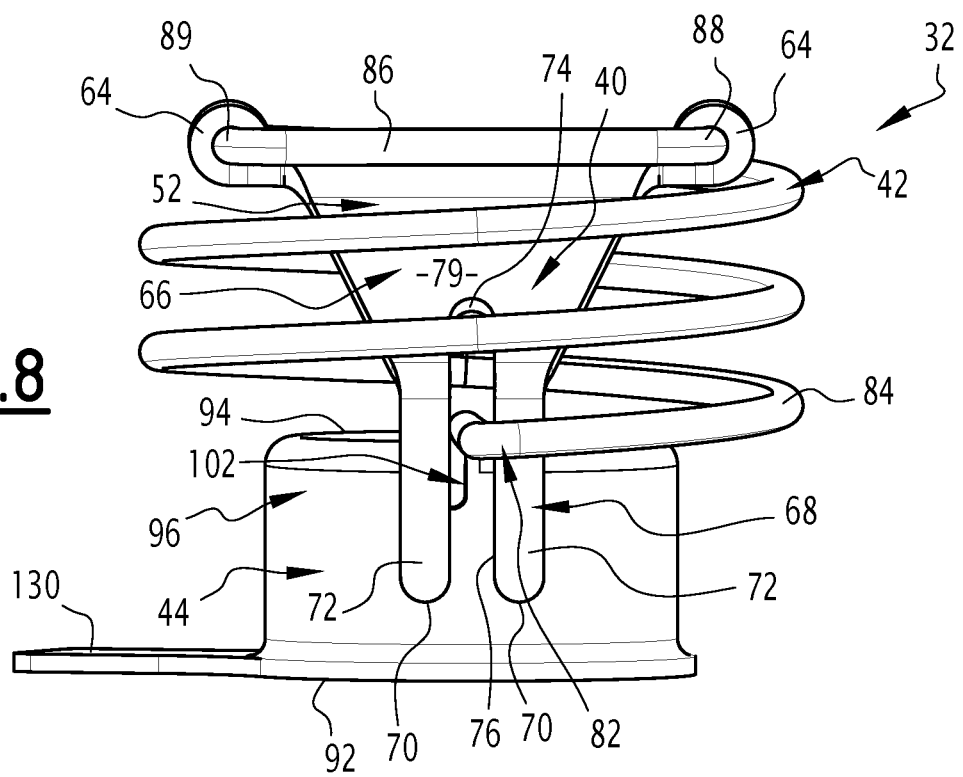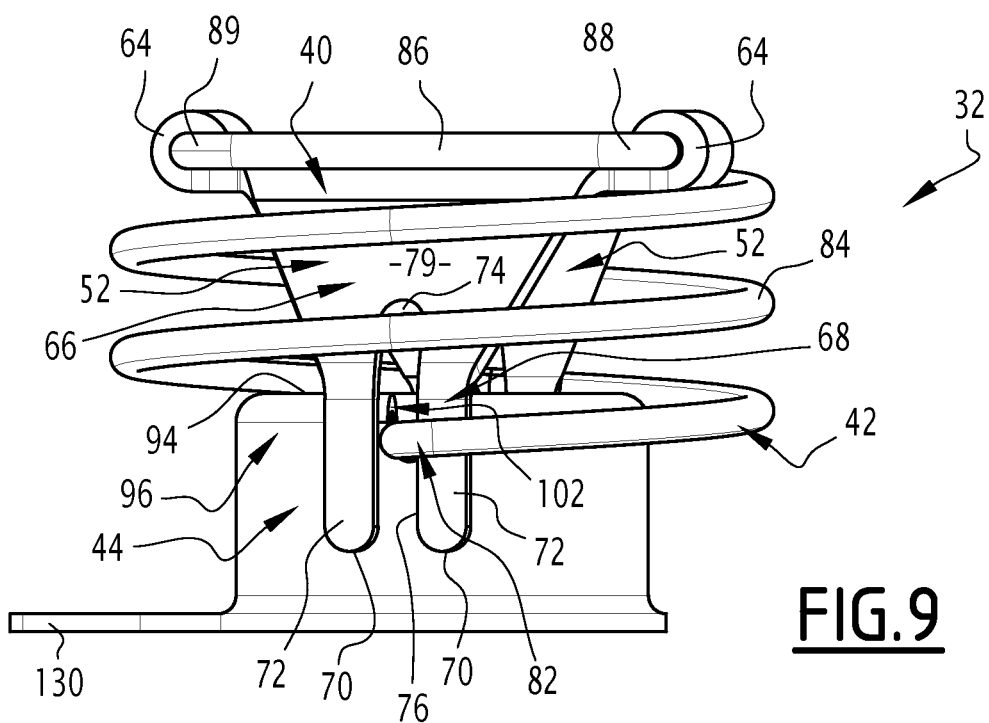

EXHAUST LINE VALVE WITH FACILITATED COUPLING BETWEEN THE ACTUATOR AND THE FLAP, AND METHOD OF ASSEMBLING SUCH A VALVE

CROSS-REFERENCE TO RELATED APPLICATIONS

This application is a U.S. non-provisional application claiming the benefit of French Application No. 1761702, filed on Dec. 6, 2017, which is incorporated herein by herein in its entirety.

FIELD OF INVENTION

The present invention relates to a valve for a motor vehicle exhaust line of the type comprising a tubular valve body defining a passage, a flap that is mounted to pivot about a pivot axis between a closed position and an open position relative to the valve body, an actuator moving the flap between the closed and open positions, and a device coupling the flap to the actuator, wherein the coupling device comprises:
- a compression spring comprising a proximal end that is fixed in rotation about the pivot axis with a first element between the flap and an output shaft of the actuator, and a distal end,
- a seat linked to the distal end of the compression spring, wherein the seat is fixed in rotation about the pivot axis with the first element between the flap and the output shaft of the actuator, and
- a torsionally-rigid transmission member, fixed in rotation about the pivot axis with the first element and able to immobilize the distal end of the compression spring relative to the proximal end in a plane that is orthogonal to the pivot axis, wherein the transmission member comprises at least one elongated slot that is parallel to the pivot axis.

The invention also relates to a method of assembling such a valve.

The invention is more particularly intended for application to electrically-actuated valves, i.e. to valves whose actuator is an electric actuator.

BACKGROUND OF THE INVENTION

Exhaust line valves are known that comprise a tubular valve body defining a passage, a flap that is mounted to pivot about a pivot axis between a closed position and an open position relative to the valve body, an actuator moving the flap between its closed and open positions, and a device coupling the flap to the actuator.

Conventionally, the coupling device would consist of a compression spring having a proximal end secured to the output shaft of the actuator and a distal end that is integral with the flap. This compression spring offers a double advantage: firstly, it makes it easy to allow for positioning tolerances, in particular axial, between the output shaft of the actuator and the axis of the flap; and secondly it makes it possible to extend the thermal conduction path between the flap and the actuator, thus protecting the actuator from the heat of the exhaust gases.

Such a valve is known, for example, from WO 2016/091565.

These valves, however, are not entirely satisfactory. In fact, the compression spring does not allow the rigid transmission of torsional forces applied by the actuator. As a result, it is not possible to precisely adjust the angular position of the flap, and thus to precisely adjust the flow of gas through the valve.

To solve this problem, valves have been proposed whose coupling device comprises torsionally-rigid transmission members that are designed to allow transmission without deformation of the torque between the actuator and the flap. Such a valve is known, for example, from US 2017/0138274.

However, the coupling device of these valves generally comprises many parts, and is therefore complex and expensive to produce.

Also known are electrically-actuated exhaust line valves whose actuator is equipped with a safety spring allowing the output shaft of the actuator to return to an angular safety position in the event of the power supply of the actuator being cut off. However, when these valves must also allow the rigid transmission of torque between the actuator and the flap, they become very difficult to assemble, because the actuator must be positioned very accurately relative to the valve body during assembly in order for the angular position of the output shaft of the actuator to correspond exactly with the angular position of the flap and allow coupling. This assembly is made even more complex when the angular travel of the output shaft of the actuator is greater than that of the flap, which is usually the case.

SUMMARY OF THE INVENTION

One object of the invention is to provide simple and inexpensive rigid torque transmission without play between the actuator and the flap. Other objectives are to allow easy coupling of the actuator to the flap during assembly of the actuator to the valve body, and to protect the actuator from the heat of the exhaust gases.

For this purpose, the invention relates to a valve of the above-mentioned type, wherein the slot is traversed by the distal end of the compression spring.

According to particular embodiments of the invention, the valve also has one or more of the following characteristics, taken in isolation or according to any technically feasible combination:
- the slots comprise two external slots radially spaced apart from one another,
- the transmission member comprises a base coupled to the first element, while the proximal end of the compression spring is fixed to the base,
- the transmission member comprises two arms spaced apart radially from one another, wherein each protrudes from the base in a direction parallel to the pivot axis, while each slot is formed in a respective arm,
- each arm comprises two branches flanking the slot in a direction that is orthoradial to the pivot axis,
- at least one of the arms comprises a finger protruding orthoradially from one of its branches, towards the other branch and away from the base,
- the base comprises a substantially flat plate and tabs each of which protrudes axially from a respective edge of the plate towards the free ends of the arms, wherein the plate is half-cut through in at least one place and folded towards the free ends of the arms, while the proximal end of the compression spring comprises two end rods that are substantially parallel to one another and an intermediate rod that extends between the two end rods, wherein the proximal end is engaged between the tabs so that each of the end rods extends along a respective tab, while the intermediate rod extends along one of the arms and is clamped between the arm and the half-cut through place, the coupling device comprises a tab that is integral with the seat, wherein the tab protrudes from the seat in a direction that is substantially radial to the pivot axis, while the transmission member comprises a safety stop that is arranged relative to the tab in order to form a circle that is centered on the pivot axis and passes through both the tab and the safety stop, the compression spring is torsionally-constrained about the pivot axis by the transmission member in order to exert a holding torque on the distal end of the compression spring to hold the distal end against a wall of the slot, the flap is subjected to a resisting torque opposing the movement of the flap between its closed and open positions, but wherein the holding torque is greater than the resisting torque, the seat has at least one notch in which the distal end of the compression spring is received, the, or each, notch is oriented in a radial direction and opens into an axial end of the seat through an opening in the axial end, wherein it comprises a portion of the bottom defining a bottom of the notch opposite the opening, wherein the portion of the bottom has a section that is orthoradial to the substantially V-shaped pivot axis whose point defines the bottom of the notch, the, or each, notch comprises an opening portion connecting the portion of the bottom to the opening, while the outlet portion is delimited in a direction that is orthoradial to the pivot axis, by two substantially flat opposing surfaces each of which extends in a plane that is substantially parallel to the pivot axis, the, or each, slot is oriented in a direction that is radial to the pivot axis, and the distal end of the compression spring is formed by two rectilinear and collinear segments that are aligned along a radially oriented axis and intersect the pivot axis, and an intermediate section connecting the segments.

The invention also relates to a method of assembling a portion of the coupling device of a valve as defined above, comprising the following steps:

supply of the transmission member, supply of the compression spring, engagement of the proximal end of the compression spring in the transmission member as far as the contact of the proximal end with the base, by a translation that is substantially orthogonal to the base, engagement of the distal end of the compression spring in each slot, through compression-torsion, stopping the torsional force applied to the compression spring causing contact of the distal end with a respective branch of each arm, and stopping the compressive force applied to the compression spring, causing the contact of the distal end with the finger.

The invention also relates to a method of assembling a valve as defined above, comprising the following steps:

providing the valve body, the flap and the seat, wherein the flap is mounted to pivot about a first pivot axis relative to the valve body, while the seat is fixed in rotation about the first pivot axis relative to the flap, providing the actuator, the compression spring and the transmission member, wherein the proximal end of the compression spring is fixed in rotation about a second pivot axis relative to the output shaft of the actuator, while the distal end of the compression spring extends through the, or each, slot, bringing the actuator closer to the valve body, wherein the seat bears against the distal end of the compression spring in order to compress the compression spring, attaching the actuator to the valve body so that the first and second pivot axes are substantially aligned, and pivoting the output shaft of the actuator about the second pivot axis, wherein the pivoting causes the distal end of the compression spring to pivot to a position in which the distal end faces a complementary recess formed in the seat, and wherein the distal end is moved into the complementary recess under the effect of the axial force of the compression spring, while the displacement brings the seat into engagement with the distal end of the compression spring.

BRIEF DESCRIPTION OF THE DRAWINGS

Other features and advantages of the invention will become apparent upon reading the description which follows, given solely by way of example and with reference to the appended drawings, wherein:

FIG. 8 shows an elevational view of the coupling device of FIG. 2, in a triggered configuration, FIG. 9 show a view similar to that of FIG. 8, in an engaged configuration.

DETAILED DESCRIPTION

Figure 1:
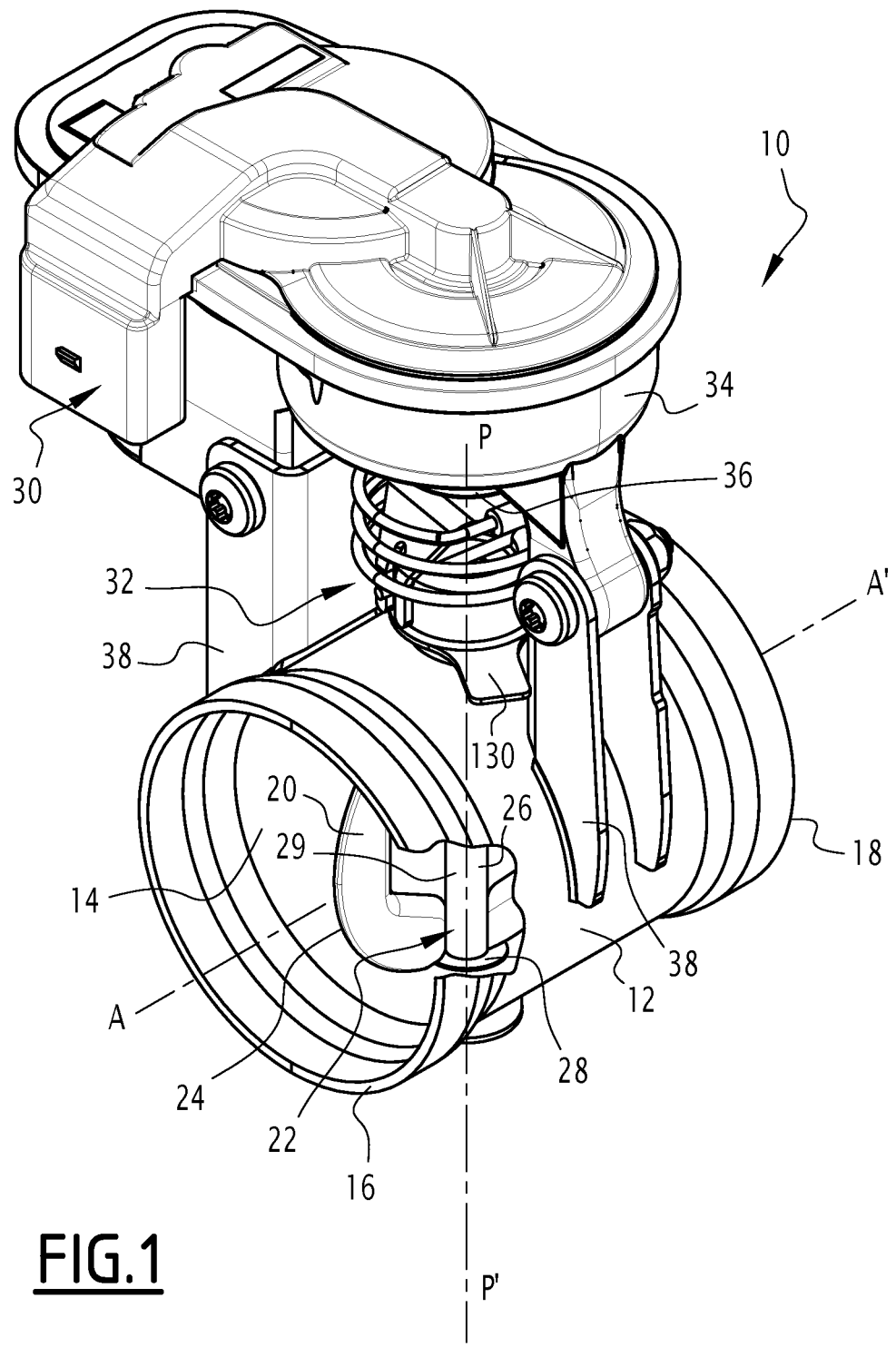
FIG. 1 shows a perspective view of a valve according to a first embodiment, wherein a device for coupling the valve is in an engaged configuration.

The valve 10 shown in FIG. 1 belongs to a motor vehicle exhaust line (not shown) comprising, in a known manner, a manifold for collecting the exhaust gases of a vehicle engine, an exhaust port for exhaust gas from the vehicle and, between the manifold and the port, a network of ducts to guide the exhaust gases from the manifold to the port. This network of ducts comprises an upstream exhaust gas duct, a downstream exhaust gas duct and, interposed between the upstream and downstream ducts, the valve 10 whose role is to control the passage of exhaust gas between the upstream and downstream ducts. Optionally, this valve 10 may be part of pollution control equipment or noise equipment of the network of ducts.

The valve 10 comprises a tubular valve body 12 that is intended to contain the exhaust gases and defines a passage 14 that extends along a central axis A-A' from an upstream end 18, and is fluidly connected to the upstream duct, up to a downstream end 16 that is fluidly connected to the downstream duct.

The valve body 12 also has a through opening (not shown) centered on an axis P-P' that is orthogonal to the axis A-A', wherein the opening opens into the passage 14 and to the outside the valve body 12.

In the following, the terms of orientation are understood by reference to the axis P-P', the qualifier "axial" denotes the directions parallel to the axis P-P', the qualifier "radial" denotes directions perpendicular to the axis P-P', while the qualifier "orthoradial" denotes a direction passing through a point radially spaced apart from the axis P-P', wherein the direction is perpendicular to a radial direction passing through this point. It should be noted that "perpendicular" is used here to denote directions orthogonal to each other and having a point of intersection.

The valve 10 also comprises a flap 20 that is movable inside the body 12, and a device 22 for guiding the flap 20 relative to the valve body 12 to enable the flap 20 to pivot relative to the valve body 12 about the axis P-P' between a closed position and an open position of the passage 14, wherein the axis P-P' thus constitutes a pivot axis of the flap 20. This pivot axis P-P' is orthogonal to the axis A-A', while the valve body 12, the flap 20 and the guide device 22 together form a butterfly valve.

The flap 20 has a contour 24 in a plane containing the pivot axis P-P'. In the closed position (not shown), the flap 20 is disposed across the passage 14, wherein the points of the contour 24 furthest from the axis P-P' bear against the valve body 12. In the open position of as shown in FIG. 1, the flap 20 is oriented substantially parallel to the passage 14, while the plane of the contour 24 is substantially parallel to the axis A-A'.

The guide device 22 comprises a shaft 26 engaged in the through opening and connected to the flap 20, and at least one bearing 28 to guide the shaft 26 relative to the body 12.

The shaft 26 is substantially coaxial with the axis P-P' and extends from one side of the through opening. It has a section 29 connecting the flap 20, and through which the shaft 26 is fixed to the flap 20 in rotation about the axis P-P', and a drive end (not shown).

The connecting section 29 extends in the passage 14. It is typically welded to the flap 20.

The drive end extends out of the passage 14 through the through opening.

In the example shown, the guide bearings 28 are two in number. These guide bearings 28 comprise a proximal guide bearing (not shown), which is disposed at the through opening, and a distal guide bearing, which is the one visible in FIG. 1. The guide bearings 28 are aligned along the pivot axis P-P' and are arranged diametrically opposite to the axis A-A'. Each of these bearings 28 is disposed at the interface between the shaft 26 and the valve body 12 and is designed to minimize friction between the shaft 26 and the valve body 12.

Despite the guide bearings 28, frictional forces are exerted on the shaft 26, wherein the frictional forces generate a resisting torque opposing the displacement of the flap 20 between its closed and open positions. The pressure of the exhaust gases on the flap 20 may also contribute to this resisting torque.

The valve 10 further comprises a motorized actuator 30 to cause the displacement of the flap 20 between its closed and open positions, and a device 32 for coupling the flap 20 to the actuator 30.

The actuator 30 comprises a housing 34, an output shaft 36 protruding from the housing 34, coaxially with the axis P-P', and mounted to rotate about the axis P-P' relative to the housing 34, and a motor (not shown) that is at least partly enclosed in the housing 34, and is designed to drive the output shaft 36 in rotation about its axis relative to the housing 34.

The motor is preferably reversible, wherein the actuator 30 comprises a return member (not shown) for returning the output shaft 36 to a default angular position when the motor does not provide torque. This return member is typically enclosed in the housing 34 and is in the form, for example, of a spiral spring mounted between the housing 34 and the output shaft 36.

The output shaft 36 comprises an end (not shown) for connection to the coupling device 32, wherein this connection end comprises a base and two lugs protruding from the base and parallel to the axis P-P' in the direction of the passage 14, wherein the lugs define a slot between them.

The angular travel of the output shaft 36 is greater than the angular travel of the flap 20 between its closed and open positions.

The actuator 30 is so designed that the output shaft 36 exerts maximum torque on the coupling device 32. This maximum torque typically depends on the maximum engine torque, the reduction ratio, and the reduction ratio efficiency between the engine rotor and the output shaft 36.

The actuator 30 is attached to the valve body 12 via a flange 38.

Figure 2:
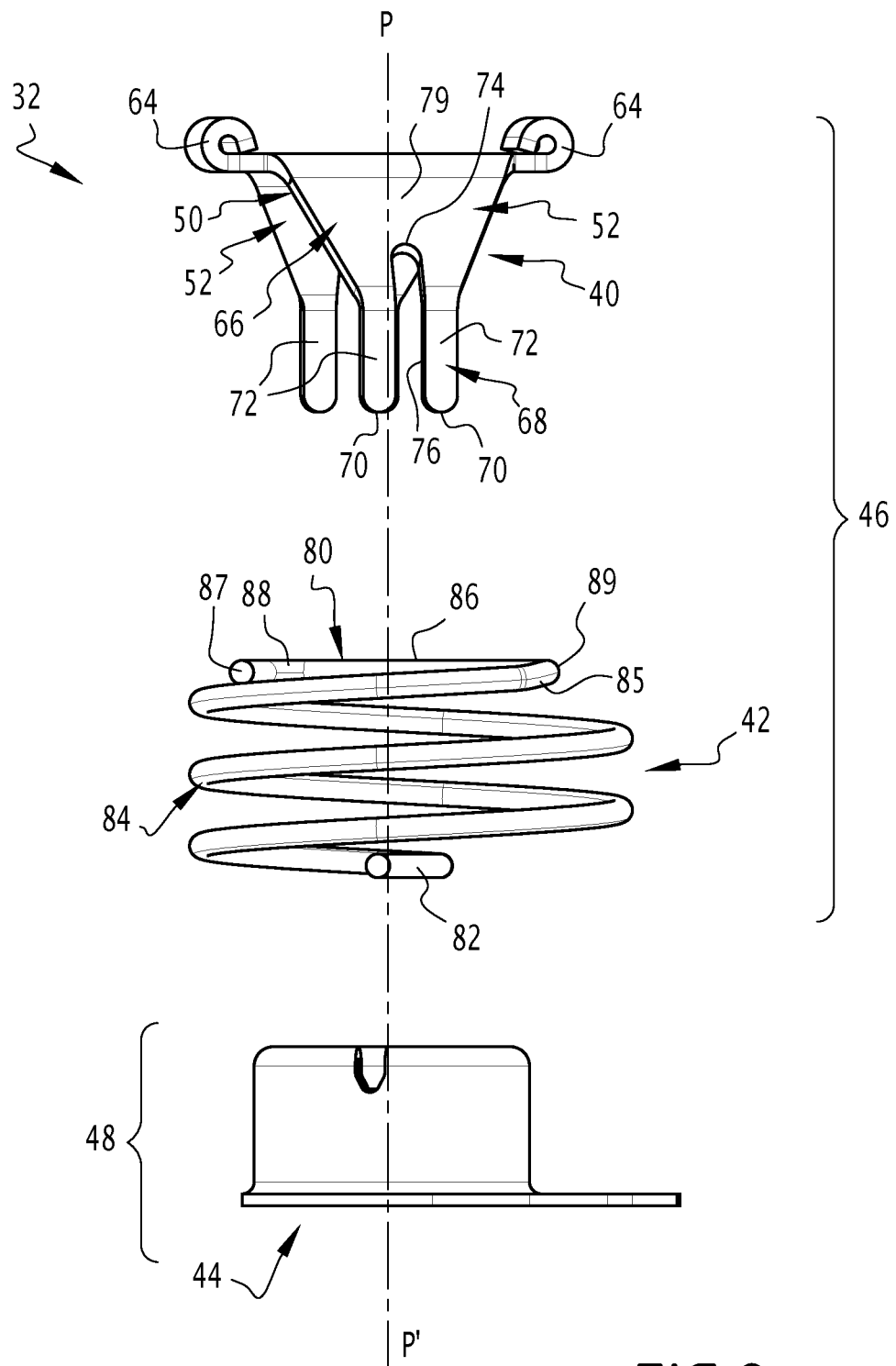
FIG. 2 shows an exploded perspective view of the coupling device of the valve of FIG. 1.

Referring to FIG. 2, the coupling device 32 comprises a torsionally-rigid transmission member 40, a compression spring 42, and a seat 44. The transmission member 40 and the compression spring 42 together form a first portion 46 of the coupling device 32, while the seat 44 belongs to a second portion 48 of the coupling device 32.

The transmission member 40 comprises a base 50 and two arms 52 spaced radially apart from each other, wherein each protrudes from the base 50 in a direction parallel to the pivot axis P-P'.

Figure 4:
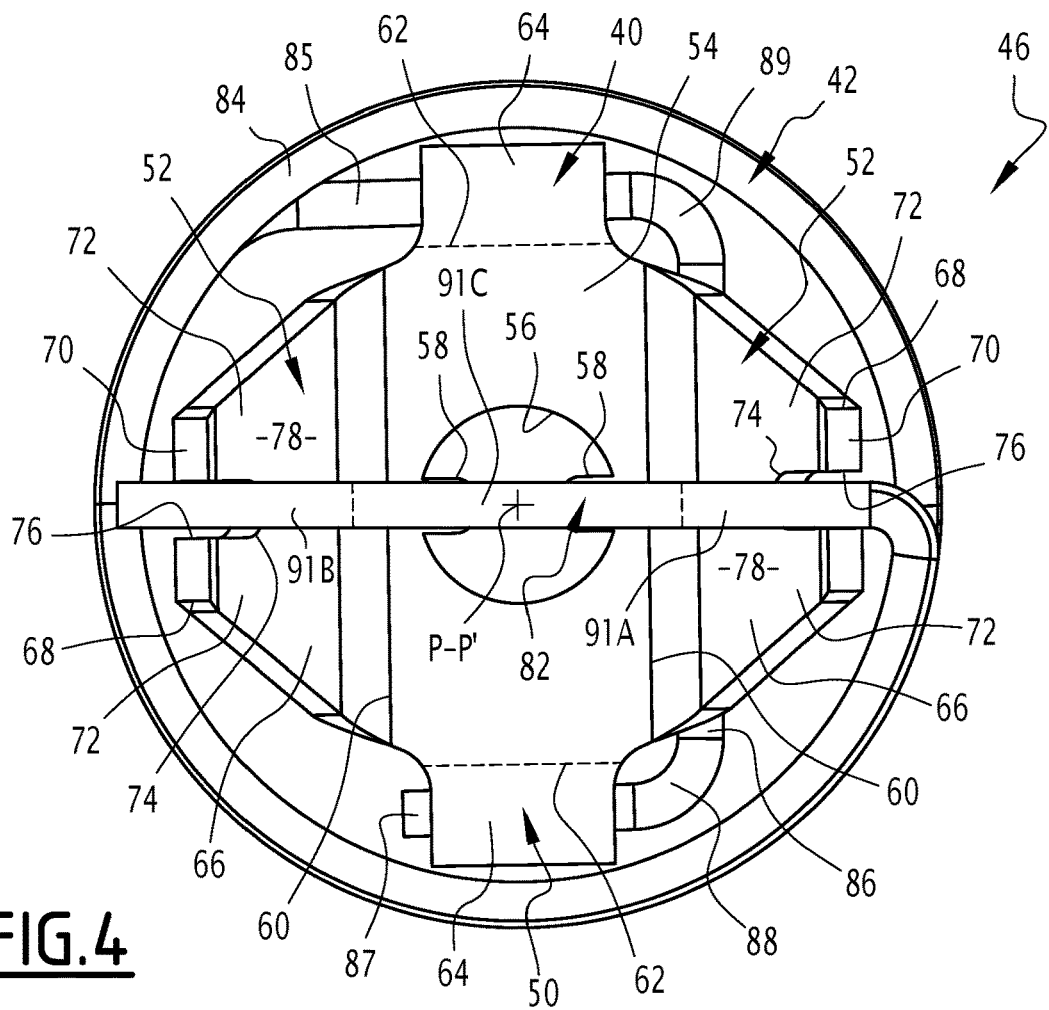
FIG. 4 shows a view from below of the first portion of FIG. 3.

The base 50 comprises a substantially flat plate 54 that is substantially orthogonal to the axis P-P'. As shown in FIG. 4, this plate 54 is generally rectangular in shape and has a through hole 56 that is substantially coaxial with the axis P-P' and is substantially at its center. The plate 54 also has two lugs 58 each of which protrudes from the contour of the through hole 56, towards its center, wherein the lugs 58 are diametrically opposed to one another.

The transmission member 40 is fixed in rotation with the output shaft 36 about the axis of rotation P-P'. For this purpose, the base 50 is coupled to the output shaft 36. In particular, the connection end of the output shaft 36 is engaged in the through hole 56, wherein the lugs 58 are received in the slot in this end.

The plate 54 comprises two primary edges 60 opposite one another, and two secondary edges 62 opposite one another. The primary edges 60 are long edges, while the secondary edges 62 are short edges.

The base 50 also comprises loops 64 arranged radially on either side of the plate 54, wherein each of the loops 64 is attached to a respective secondary edge 62 of the plate 54.

Each loop 64 is in the form of a rib protruding radially from a secondary edge 62 of the plate 54, opposite the P-P' axis, and folded back on itself in order to form a tube with an axis that is orthoradial to the P-P' axis.

Returning to FIG. 2, each arm 52 protrudes from a primary edge 60 of the plate 54.

Each arm 52 comprises a first section 66 connecting the base 50, followed by a second end section 68.

The first section 66 is substantially flat and extends along a plane that is inclined relative to the plate 54. The second section 68 is also substantially flat and extends in a plane that is orthogonal to the plate 54. The second section 68 extends from the first section 66 opposite the base 50 and defines a free end 70 opposite the base 50.

Each arm 52 also comprises two branches 72 spaced apart from each other in a direction that is orthoradial to the axis P-P'. Each branch 72 extends in the second section 68 from the free end 70, and extends into the first section 66.

The branches 72 meet at a junction 74 which is at a distance from the base 50, while each arm 52 is full between the junction 74 and the base 50.

The orthoradial space left free between the branches 72 forms a slot 76 that is elongated parallel to the pivot axis P-P' and is radially oriented. The slot 76 is thus flanked by the branches 72 in a direction that is orthoradial to the axis P-P'.

This slot 76 traverses radially and opens radially into an inner face 78 (FIG. 4) of the arm 52 that is oriented towards the axis P-P', and into an outer face 79 of the arm 52 that faces away from the P-P' axis. In addition, this slot 76 opens axially into the free end 70 of the arm 52, while the slot 76 is closed at its opposite axial end by the junction 74, which forms a bottom of the slot 76.

The slots 76 thus formed in the arms 52 are spaced radially apart from each other, while the slots 76 themselves are radially spaced apart from each other.

The loops 64 and the arms 52 are preferably integral with the plate 54, while the transmission member 40 is in the form of a stamped assembly formed in one piece.

Still with reference to FIG. 2, the compression spring 42 comprises a proximal end 80, a distal end 82, and a helical body 84 connecting the proximal end 80 to the distal end 82.

The compression spring 42 is able to exert an axial spreading force between its proximal end 80 and distal end 82 when the compression spring 42 is compressed, i.e. when the ends 80, 82 are at a distance from one another of less than the distance at rest. The compression spring 42 is also able to exert a torque on its proximal 80 and distal 82 ends when the compression spring 42 is twisted, i.e. when its ends 80, 82 occupy an angular position relative to one another that is different from an angular position at rest.

The proximal end 80 is formed by three rods 85, 86, 87 connected in pairs through elbows 88, 89, wherein the rods 85, 86, 87 are disposed substantially in the same plane that is orthogonal to the axis P-P'. These rods 85, 86, 87 comprise two rods 85, 87 that are substantially parallel to each other, while one rod 86 extends between the two rods 85, 87, and is substantially orthogonal to the rods 85, 87.

Figure 3:
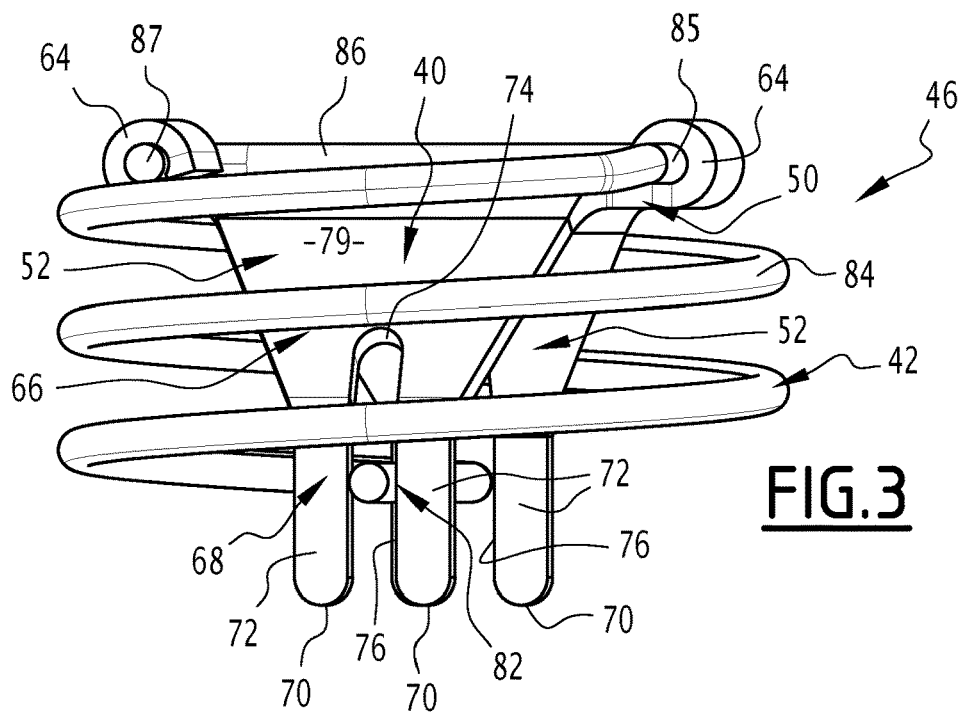
FIG. 3 shows an elevational view of a first portion of the coupling device of FIG. 2.

The proximal end 80 is fixed in rotation with the output shaft 36 of the actuator 30 about the pivot axis P-P'. For this purpose, the proximal end 80 is fixed to the transmission member 40, in particular to its base 50. In particular, the rods 85, 87 engage in the tubes formed by the loops 64, as shown in FIG. 3, and are retained in these tubes.

With reference to FIG. 4, the distal end 82 is in the form of two rectilinear and collinear segments 91A, 91B, aligned along a radially oriented axis and intersecting the P-P' axis, and an intermediate section 91C connecting the segments 91A, 91B.

Each of the segments 91A, 91B has a diameter smaller than the orthoradial width of the slots 76 formed in the arms 52 of the transmission member 40.

The intermediate section 91C is in the form of a rectilinear segment, while the distal end 82 is thus in the form of a rectilinear rod oriented radially and intersecting the axis P-P'. Alternatively, the intermediate portion 91C may be curvilinear, triangular, square, rectangular, or other form.

The distal end 82 is engaged in each of the slots 76 and passes through each of the slots 76. In particular, in the case each of the slots 76, a respective segment 91A, 91B of the distal end 82 is engaged in the slot 76.

The compression spring 42 is typically formed in one piece by a bent and helically wound metal wire.

The compression spring 42 is torsionally constrained about the axis P-P', i.e. the compression spring 42 is twisted about the pivot axis P-P' so that the distal end 82 occupies, relative to the proximal end 80, an angular position that is different from a predefined angular position occupied by the distal end 82 when the compression spring 42 is in an idle configuration in which it is not subjected to any external force. As a result, the internal stresses of the compression spring 42 exert a torque on the distal end 82 that tends to pivot the latter about the pivot axis P-P' in order to return it to its predefined angular position. Under the effect of this torque, the distal end 82 is held against a single support branch 72 of each of the arms 52 of the transmission member 40, as may be seen in FIG. 4, so that the distal end 82 occupies a very precise angular orientation relative to the transmission member 40, despite the clearance between the slots 76. The distal end 82 is thus immobilized relative to the proximal end 80 by the transmission member 40 in a plane that is orthogonal to the pivot axis P-P'.

The holding torque thus exerted on the distal end 82 is greater than the resisting torque opposing the displacement of the flap 20 between its closed and open positions.

Figure 5:
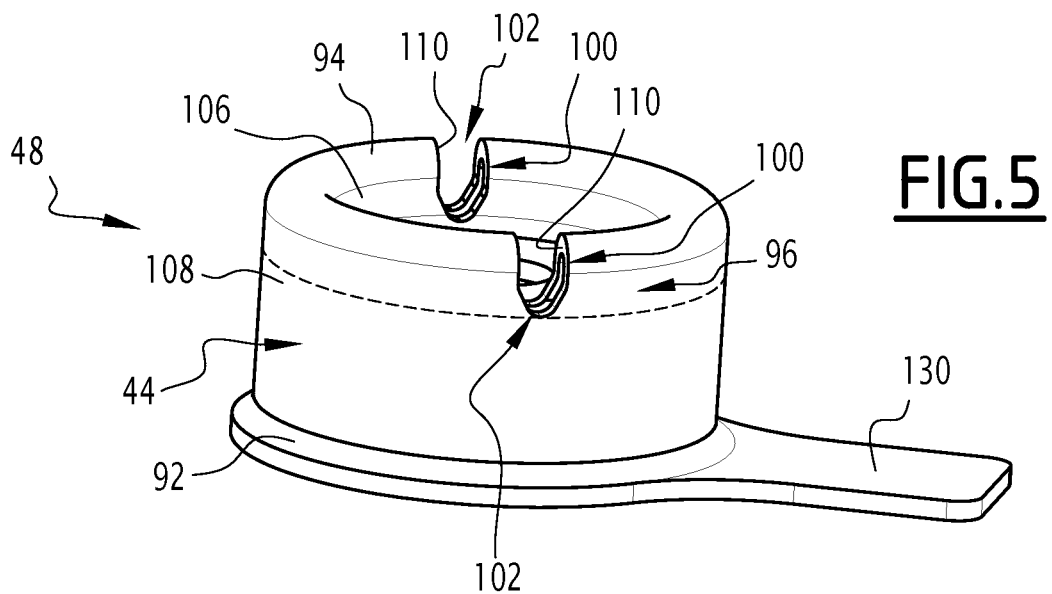
FIG. 5 shows a perspective view of a second portion of the coupling device of FIG. 2.

Referring to FIG. 5, the seat 44 comprises a cylinder 90 that is substantially coaxial with the pivot axis P-P'. This cylinder 90 comprises a proximal axial end 92 close to the valve body 12 along the axis P-P', and a distal axial end 94 at a distance from the valve body 12.

The distal axial end 94 is defined by an annular rib 96 oriented axially and substantially centered on the pivot axis P-P'.

The seat 44 has a complementary recess 100 in its distal axial end 94 that is designed to receive the distal end 82 of the compression spring 42. This complementary recess 100 is formed by two notches 102 wherein each is formed in the annular rib 96, while the notches 102 are diametrically opposite with respect to the pivot axis P-P'.

Each notch 102 is oriented in a radial direction and traverses, in particular, in this radial direction, while the notch 102 opens at the same time into an inner face 106 that is oriented towards the axis P-P' of the annular rib 96, and into an outer face 108 opposite to the axis P-P' of the annular rib 96.

Each notch 102 also opens into the distal axial end 94 through an opening 110 in the distal axial end 94.

Figure 6:
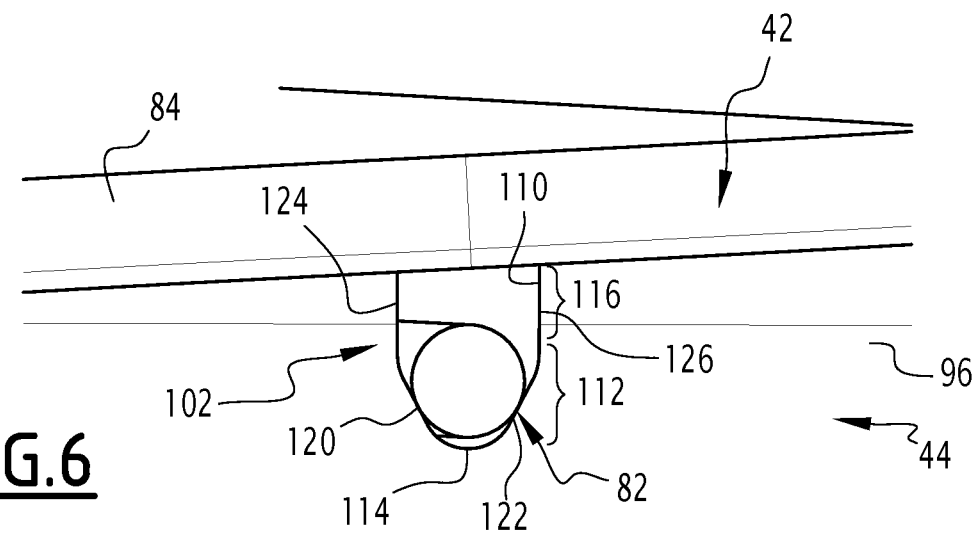
FIG. 6 shows an elevational view of a detail of the interface between the first and second portions of the coupling device of FIG. 2, in a first normal operating configuration.
Figure 7:
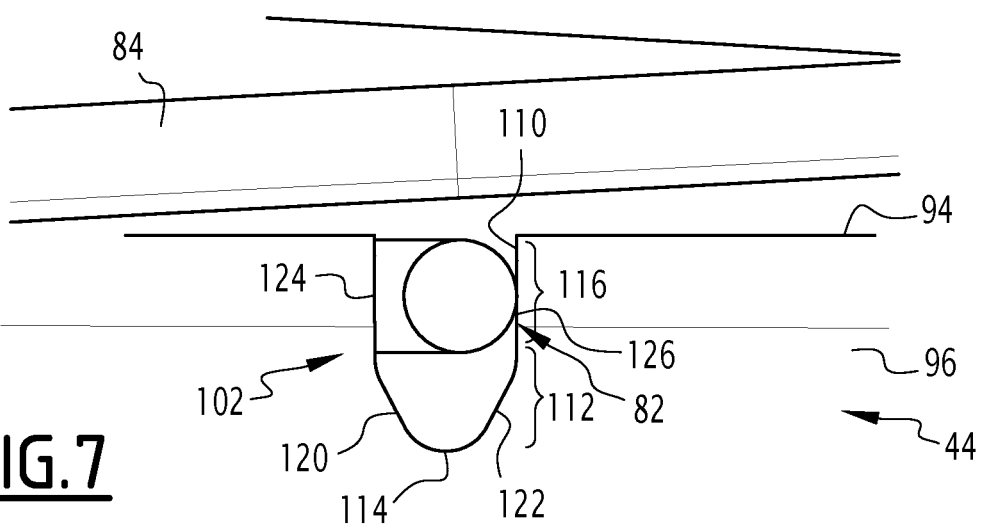
FIG. 7 shows a view similar to that of FIG. 6, in a second configuration in the case of a blocked flap.

Referring to FIGS. 6 and 7, each notch 102 comprises a bottom portion 112 defining a bottom 114 of the notch 102 opposite the opening 110, and an outlet portion 116 connecting the bottom portion 112 to the opening 110.

The bottom portion 112 has a section that is orthoradial to the substantially V-shaped pivot axis P-P' whose point defines the bottom 114 of the notch 102. The bottom portion 112 is thus delimited in a direction that is orthoradial to the pivot axis P-P' through two opposing, substantially flat, inclined surfaces 120, 122 that converge towards one another in the direction of the bottom 114 of the notch 102.

The outlet portion 116 is itself delimited in a direction that is orthoradial to the pivot axis P-P' by two opposite straight surfaces 124, 126 that are substantially flat and each of which extends in a plane that is substantially parallel to the pivot axis P-P'. The distance between these straight surfaces 124, 126 is greater than the diameter of the distal end 82 of the compression spring 42.

The bottom 114 of each notch 102 is at an axial distance from the proximal end 80 of the compression spring 42 that is less than the axial length of the compression spring 42 when at rest.

The distal end 82 of the compression spring 42 is received in each of the notches 102 as shown in FIGS. 6 and 7, which allows the transmission of a torque between the compression spring 42 and the seat 44, wherein this torque is below a threshold torque, and wherein this distal end 82 is received in the bottom portion 112 under the effect of the axial spreading force exerted by the compression spring 42 as shown in FIG. 6, wherein the distal end 82 simultaneously presses on the two surfaces 120, 122, which ensures precise positioning of the seat 44 relative to the distal end 82. On the other hand when the torque is greater than the threshold torque, for example in the event of the flap 20 being blocked, the axial spreading force exerted by the compression spring 42 is not sufficient to hold the distal end 82 in the bottom portion 112, and the distal end 82 is moved into the outlet portion 116, whose straight surfaces 124, 126 prevent the distal end 82 from coming out of the notch 102, as shown in FIG. 7.

The threshold torque is greater than the resisting torque opposing the displacement of the flap 20 between its closed and open positions.

Returning to FIG. 5, the second portion 48 also comprises a tab 130 secured to the seat 44, wherein the tab 130 protrudes from the seat 44 in a direction that is substantially radial to the pivot axis P-P'. As shown in FIG. 1, this tab 130 is designed to abut against the flange 38 when the flap 20 is in the open position.

Referring to FIGS. 8 and 9, the arms 52 of the transmission member 40 have a radial spacing that is greater than the diameter of the seat 44, so that the arms 52 flank the seat 44 radially. Thus, the slots 76 are both slots that radially flank the seat 44 and, more particularly, the notches 102.

Alternatively, the seat 44 may radially flank the two slots 76.

Moreover, each arm 52 has a length that is greater than the distance between the base 50 and the bottom 114 of the notches 102. Consequently, the distal end 82 of the compression spring 42 remains engaged in the slots 76 even when it is received in the bottom portion 112 of the notches 102.

A method of assembling the valve 10 will now be described, with reference to FIGS. 1 to 9.

First of all, the valve body 12, the flap 20, the flange 38 and the second portion 48 of the coupling device 32 are provided, wherein the flap 20 is mounted to pivot about a first pivot axis relative to the valve body 12 via the guide device 22, while the seat 44 is fixed in rotation about the first pivot axis relative to the flap 20.

Then the actuator 30 is, in turn, supplied with the first portion 46 of the coupling device 32. The output shaft 36 of the actuator 30 is engaged in the through-hole 56 of the base 50 of the transmission member 40, so that the proximal end 80 of the compression spring 42 is fixed in rotation about a second pivot axis relative to the output shaft 36. In addition, the compression spring 42 is torsionally constrained about the second pivot axis, wherein the distal end 82 of the compression spring 42 extends through each slot 76.

Thereafter, the actuator 30 is brought closer to the valve body 12. The axial distal end 94 of the seat 44 then bears against the distal end 82 of the compression spring 42 and compresses it, while the distal end 82 of the spring compression member 42 retreats into slots 76 towards the junction 74, as shown in FIG. 8.

The next step is to attach the actuator 30 to the valve body 12 via the flange 38, so that the first and second pivot axes are substantially aligned, thereby forming the P-P' pivot axis. The distal end 82 of the compression spring 42 is then always pressed against the distal axial end 94 of the seat 44, out of the notches 102.

It should be noted that this fixing is particularly easy to achieve since it is sufficient to ensure proper positioning of the actuator 30 relative to the body 12, which may be easily achieved via the flange 38, without having to worry about the relative orientation of the flap 20 and the output shaft 36.

Finally, the output shaft 36 of the actuator 30 is pivoted about the second pivot axis, typically by being driven by the motor. This pivoting causes the distal end 82 of the compression spring 42 to pivot relative to the seat 44 to a position in which the distal end 82 is opposite the notches 102. The distal end 82 is then moved into the notches 102 under the effect of the axial spreading force exerted by the compression spring 42, wherein the displacement places the seat 44 in engagement with the distal end 82 of the compression spring 42. The actuator 30 and the flap 20 are then coupled, while the end of the pivoting of the output shaft 36 simultaneously drives the pivoting of the flap 20 relative to the valve body 12.

The angular position of the flap 20 may then be precisely adjusted thanks to the absence of play pivoting about the axis P-P' permitted by the coupling device 32.

Thus, the invention described above allows a torque transmission without play between the actuator 30 and the flap 20.

In addition, this transmission is made in a simple and inexpensive way, thanks to the simplicity of the production of the coupling device 32.

Furthermore, the invention allows easy coupling of the actuator 30 to the flap 20 when assembling the actuator 30 to the valve body 12, as described above.

Finally, the invention makes it possible to protect the actuator 30 from the heat of the exhaust gases since the thermal path between the actuator 30 and the flap 20 follows the helicoidal body 84 of the compression spring 42, wherein the helicoidal body 84 has a large exchange surface with the air allowing a significant dissipation of heat.

Figure 10:
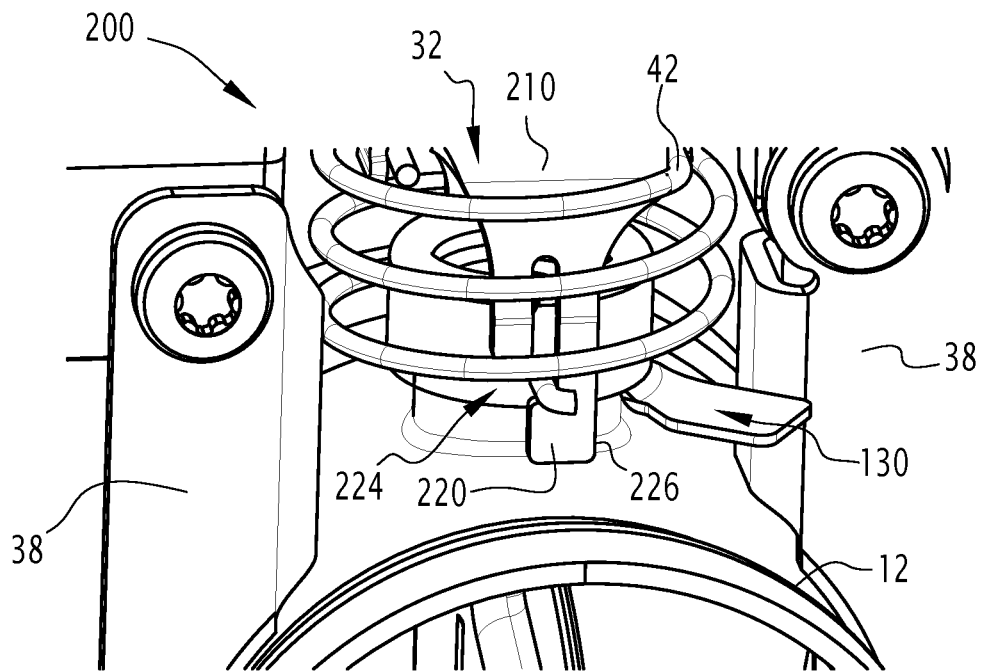
FIG. 10 shows a perspective view of a valve according to a second embodiment, wherein a device for coupling the valve is in an engaged configuration.
Figure 11:
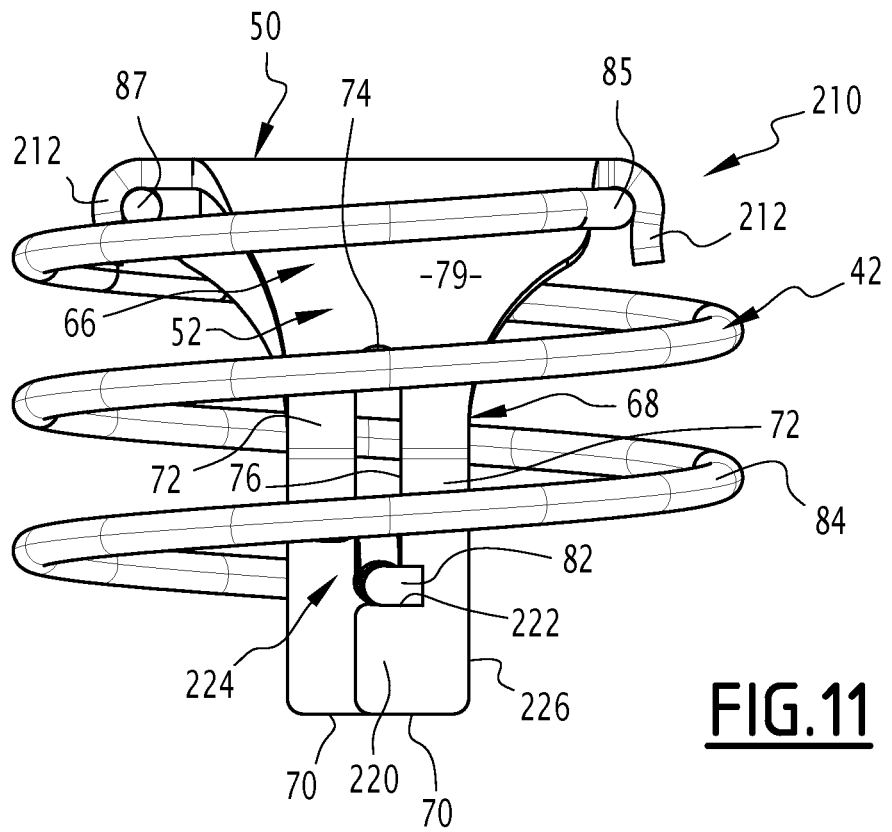
FIG. 11 shows an elevational view of a first portion of the coupling device of the valve of FIG. 10, in a configuration before assembly of the actuator on the valve.
Figure 12:
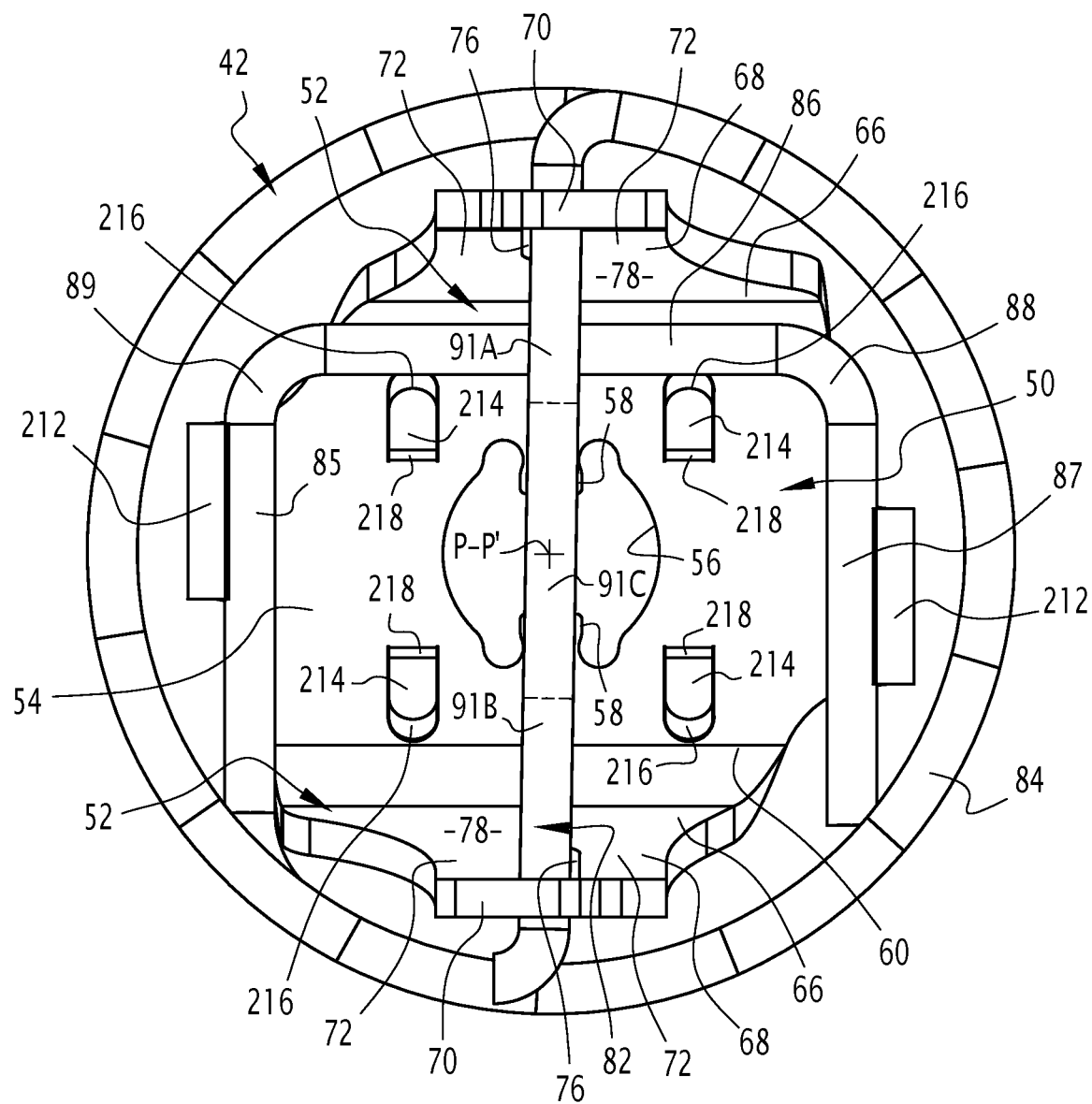
FIG. 12 shows a bottom view of the first portion of FIG. 11.

The valve 200 of FIGS. 10 to 12 differs from the valve 10 exclusively in the characteristics of its transmission member 210.

Like the transmission member 40, the transmission member 210 comprises a base 50 and two arms 52 spaced radially apart from one another, wherein each protrudes from the base 50 in a direction parallel to the pivot axis P-P'.

The base 50 comprises a substantially flat plate 54 oriented substantially orthogonally to the axis P-P'. As may be seen in FIG. 4, this plate 54 is generally rectangular in shape and has a through-hole 56 substantially in its center and substantially coaxial with the axis P-P'. The plate 54 also has two lugs 58 each of which protrudes from the contour of the through-hole 56, towards its center, wherein the lugs 58 are diametrically opposite to one another.

The connecting end of the output shaft 36 is engaged in this through hole 56, while the lugs 58 are received in the slot in this end.

The plate 54 comprises two primary edges 60 opposite one another, and two secondary edges 62 opposite one another. The primary edges 60 are long edges, while the secondary edges 62 are short edges.

Each arm 52 protrudes from a primary edge 60 of the plate 54.

Each arm 52 comprises a first section 66 connecting the base 50, followed by a second end section 68.

The first section 66 is substantially flat and extends along a plane inclined relative to the plate 54. The second section 68 is also substantially flat and extends in a plane that is orthogonal to the plate 54. The second section 68 extends from the first section 66 opposite the base 50 and defines a free end 70 opposite the base 50.

Each arm 52 also comprises two branches 72 spaced apart from each other in a direction that is orthoradial to the axis P-P'. Each branch 72 extends in the second section 68 from the free end 70, and extends into the first section 66.

The branches 72 meet at a junction 74 which is at a distance from the base 50, while each arm 52 is full between the junction 74 and the base 50.

The orthoradial space left free between the branches 72 forms a slot 76 that is elongated parallel to the pivot axis P-P' and is radially oriented. The slot 76 is thus flanked by the branches 72 in a direction that is orthoradial to the axis P-P'.

The slot 76 traverses radially and opens radially into an inner face 78 of the arm 52 that is oriented towards the axis P-P', and into an outer face 79 of the arm 52 that is oriented away from the axis P-P'. In addition, this slot 76 opens axially into the free end 70 of the arm 52, while the slot 76 is closed at its opposite axial end by the junction 74, which forms a bottom of the slot 76.

The slots 76 are thus formed in the arms 52 which are spaced apart radially from each other, while the slots 76 themselves are spaced apart radially from one another.

However, unlike the transmission member 40, the base 50 of the transmission member 210 does not comprise loops 64.

Instead, as shown in FIG. 11, the base 50 comprises tabs 212 each of which protrudes axially towards the free ends 70 of the arms 52 from a respective secondary edge 62 of the plate 54.

These tabs 212 are preferably integrally formed with the plate 54, so that the transmission member 210 remains a stamped assembly formed in one piece.

In addition, as shown in FIG. 12, the plate 54 is half-cut through 214 in at least one place and folded towards the free ends 70 of the arms 52. Each half-cut-through place 214 is interposed between an arm 52 and a plane (not shown) that is equidistant from the arms 52, and comprises a free end 216 facing the arm 52, and a base 218 for connection to the plate 54 facing the equidistant plane.

These half-cut-through places 214 are, in particular four in number, wherein a first pair of them is interposed between the equidistant plane and a first of the arms 52, while the second pair is interposed between the equidistant plane and the second arm 52.

The proximal end 80 of the compression spring 42 is then engaged between the tabs 212 so that each of the rods 85, 87 extends along a respective tab 212, while the rod 86 extends along one of the arms 52, between the arm 52 and the half-cut-through place 214 associated with this arm 52.

Furthermore, as may be seen in FIG. 11, for each arm 52, one of the branches 72 is longer than the other branch 72 and carries a finger 220 at its free end 70 that protrudes orthoradially from the branch 72 in the direction the other branch 72, while the finger 220 extends over substantially the entire width of the slot 76.

This finger 220 defines a shoulder 222 facing the slot 76 and is at a distance from the base 50 that is less than the axial length of the compression spring 42 at rest.

The branch 72 bearing the finger 220 is formed, in particular, by the branch 72 against which the distal end 82 bears under the effect of the torsional constraint of the compression spring 42.

The finger 220 thus retains the distal end 82 of the compression spring 42 when the first portion 46 of the coupling device 32 is not yet coupled. The mounting of the valve 200 is further facilitated.

This finger 220 is, in particular, at a distance from the free end of the other branch 72, in order to leave a passage 224 for inserting the distal end 82 of the compression spring 42 into the slot 76. Thus, the passage 224 combined with the tabs 212 and the half-cut-through places 214, allows easy pre-assembly of the compression spring 42 in the transmission member 210. The pre-assembly movement comprises a translation movement for the engagement of the proximal end 80 of the compression spring 42 in the transmission member 210 and a combined torsion-translation movement for the engagement of the distal end 82 in the slot 76.

In addition, the length of the branch 72 carrying the finger 220 is so designed that this branch 72 crosses a circle (not shown) that is centered on the pivot axis P-P' and passes through the tab 130, as may be as seen in FIG. 10. Thus, the branch 72 defines a safety stop 226 that is designed to bear against the tab 130, thus making it possible to cause the flap 20 to pivot via the actuator 30, even in the event of rupture of the compression spring 42. This may be used to return the flap 20 to the open position in order to avoid smothering the engine of the vehicle.

In this second embodiment, the first part 46 of the coupling device 32 is assembled prior to its coupling with the output shaft 36 of the actuator 30.

To do this, the transmission member 210 and the compression spring 42 are first provided. The proximal end 80 of the compression spring 42 is then engaged in the transmission member 210 by a translation movement that is substantially orthogonal to the base 50, until the proximal end 80 contacts the base 50. The distal end 82 of the compression spring 42 is engaged in each slot 76 through compression-torsion via the passage 224.

The torsional force applied to the compression spring 42 is then stopped. Under the effect of the torque exerted by the spring 42 on its distal end 82 to return the latter to its position of rest, the distal end 82 is brought into contact with a respective branch 72 of each arm 52.

Finally, the compression force applied to the compression spring 42 is stopped. Under the effect of the axial force exerted by the spring 42 on its distal end 82 to return the latter to its position of rest, the distal end 82 is brought into contact with the shoulder 222 of the finger 220.

The first portion 46 may thus be preassembled and easily handled during the assembly of the valve 200, which process is carried out in a manner identical to that described for the valve 10.

It will be noted that, in the examples given above, the proximal end 80 of the compression spring 42 and the transmission member 40, 210 are always fixed in rotation with the output shaft 36 of the actuator 30, while the seat 44 is fixed in rotation with the flap 20. However, the invention is not limited to these embodiments alone and, according to a variant of the invention (not shown), the positions of the first and second portions 46, 48 of the coupling device 32 may be reversed, wherein the proximal end 80 of the compression spring 42 and the transmission member 40, 210 are then fixed in rotation with the flap 20, while the seat 44 is fixed in rotation with the output shaft 36 of the actuator 30.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A valve for a motor vehicle exhaust line comprising:
    a tubular valve body defining a passage;
    a flap mounted to pivot relative to the valve body about a pivot axis between a closed position and an open position of the passage;
    an actuator causing movement of the flap between the closed and open positions; and
    a coupling device that couples the flap to the actuator, wherein the coupling device comprises:
        a compression spring having a proximal end that is fixed in rotation about the pivot axis with a first element chosen between the flap and an output shaft of the actuator, and a distal end,
        a seat that is engaged with the distal end of the compression spring, wherein the seat is fixed in rotation about the pivot axis with a second element chosen between the flap and the output shaft of the actuator, and
        a transmission member that is torsionally-rigid and fixed in rotation about the pivot axis with the first element, and that is designed to immobilize the distal end of the compression spring relative to the proximal end in a plane that is orthogonal to the pivot axis, the transmission member having at least one support branch that is off-center and extends at least partly parallel to the pivot axis,
    wherein the compression spring is torsionally constrained about the pivot axis by the transmission member to exert on the distal end of the compression spring a holding torque that holds the distal end against the at least one, or each, support branch.

2. The valve according to claim 1, wherein the at least one support branch comprises two support branches spaced apart radially from one another.

3. The valve according to claim 1, wherein the at least one, or each, support branch defines a wall of a respective slot that is elongated parallel to the pivot axis and traversed by the distal end of the compression spring.

4. The valve according to claim 1, wherein the transmission member comprises a base coupled to the first element, the proximal end of the compression spring being attached to said base.

5. The valve according to claim 4, wherein the at least one, or each, support branch defines a wall of a respective slot that is elongated parallel to the pivot axis and traversed by the distal end of the compression spring, and wherein the transmission member comprises at least one arm protruding from the base in a direction parallel to the pivot axis, the, or each, slot being formed in a respective arm.

6. The valve according to claim 5, wherein the at least one arm comprises two arms that are spaced radially apart from one another.

7. The valve according to claim 5, wherein the at least one, or each, arm comprises two branches that flank the slot in a direction that is orthoradial to the pivot axis, one of the two branches being constituted by the at least one support branch.

8. The valve according to claim 7, wherein the at least one arm comprises a finger protruding orthoradially from the at least one support branch, towards the other branch of the two branches, at a distance from the base.

9. The valve according to claim 1, wherein the coupling device comprises a tab that is integral with the seat, and wherein the tab protrudes from the seat in a direction that is substantially radial to the pivot axis, while the transmission member comprises a safety stop that is arranged relative to the tab in such a manner that a circle may be traced that is centered on the pivot axis and passes through both the tab and the safety stop.

10. The valve according to claim 1, wherein the flap is subjected to a resisting torque that opposes the movement of the flap between the closed and open position, the holding torque being greater than the resisting torque.

11. The valve according to claim 1, wherein the seat has at least one notch in which the distal end of the compression spring is received.

12. The valve according to claim 11, wherein the at least one, or each, notch is oriented in a radial direction, opens into an axial end of the seat through an opening that is formed in the axial end, and comprises a bottom portion defining a bottom of the notch opposite the opening, the bottom portion having, in a plane that is orthoradial to the pivot axis, a section that is substantially shaped as a V whose tip defines the bottom of the notch.

13. The valve according to claim 12, wherein the at least one, or each, notch comprises an outlet portion connecting the bottom portion to the opening, the outlet portion being delimited in a direction that is orthoradial to the pivot axis through two substantially flat opposed surfaces, each of which extend in a plane that is substantially parallel to the pivot axis.

14. The valve according to claim 1, wherein the transmission member is formed in one piece.

15. The valve according to claim 1, wherein the seat has a complementary recess in a distal axial end, the complementary recess being formed by two notches.

16. The valve according to claim 15, wherein the distal end of the compression spring is received in each of the two notches to allow transmission of a torque between the compression spring and the seat.

17. The valve according to claim 1, wherein the transmission member comprises a base, arms spaced apart from one another and protruding from the base in a direction toward the seat, and at least one loop or tab that extends outwardly from a periphery of the base to engage with the proximal end of the compression spring, and wherein the arms include the at least one support branch that engages the distal end of the compression spring.

18. The valve according to claim 17, wherein the at least one support branch comprises a plurality of support branches, and wherein the base comprises a substantially flat plate having two primary edges opposite one another and two secondary edges opposite one another, and wherein the at least one loop or tab extends from one of the second edges and each arm protrudes from one primary edge of the plate and extends to a free end opposite the base, and wherein each arm comprises two support branches spaced apart from each other to form a slot that receives the distal end of the compression spring.

\* \* \* \* \*